United States Patent [19]
Nakajima et al.

[11] 3,787,988
[45] Jan. 29, 1974

[54] METHOD AND ELECTRONIC MACHINE FOR TEACHING ARITHMETIC COMPUTATION

[75] Inventors: Tohru Nakajima; Masaaki Niiho, both of Tokyo, Japan

[73] Assignee: Asahi Kogaku Kogyo Kabushiki Kaisha, Tokyo-to, Japan

[22] Filed: Dec. 30, 1971

[21] Appl. No.: 214,169

[52] U.S. Cl............. 35/31 R, 35/6, 35/8 R, 235/156
[51] Int. Cl. ............................... G09b 19/02
[58] Field of Search...... 35/5, 6, 8 R, 9 R, 9 A, 9 B, 35/13, 30, 31 R, 48 R; 235/152, 156, 168; 340/172.5

[56] References Cited
UNITED STATES PATENTS

| | | | |
|---|---|---|---|
| 3,605,286 | 9/1971 | Plumly | 35/9 A |
| 3,414,985 | 12/1968 | Ashley | 35/8 |
| 3,675,339 | 7/1972 | LaMarca | 35/6 |
| 3,371,321 | 2/1968 | Adams | 35/8 R X |
| 3,248,705 | 4/1966 | Dammann et al. | 340/172.5 |
| 3,541,702 | 11/1970 | Cohen | 35/31 R X |
| 3,378,937 | 4/1968 | Warren | 35/9 R |
| 3,584,398 | 6/1971 | Meyer et al. | 35/6 X |

Primary Examiner—Robert W. Michell
Assistant Examiner—Vance Y. Hum
Attorney, Agent, or Firm—Harold D. Steinberg et al.

[57] ABSTRACT

A method and machine for teaching students such as school children arithmetic computation. The machine has a display matrix provided with a plurality of display locations which can be selected by the student, and the student can select numerals to be displayed at selected display locations so that a given arithmetic problem can be set into the display matrix and the mental calculation performed by the student can be displayed to provide at the matrix an indication of a result to the problem as calculated by the student. An electronic structure automatically calculates the correct result to the problem introduced by the student, and at each stage of the computations performed by the student, as numerals selected by the student appear at the display matrix, there is an automatic indication of whether the correct calculations have been performed by the student, with the student also having the possibility of displaying the correct final result which may be compared with the result which the student has calculated.

6 Claims, 4 Drawing Figures

PATENTED JAN 29 1974
3,787,988
SHEET 1 OF 2
fig - 1A
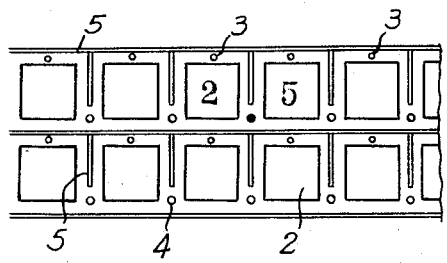
fig - 1B
fig - 2
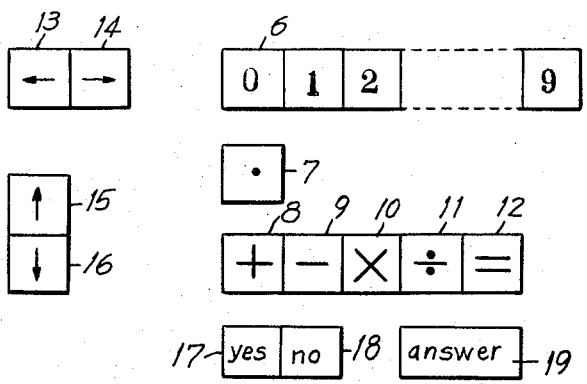

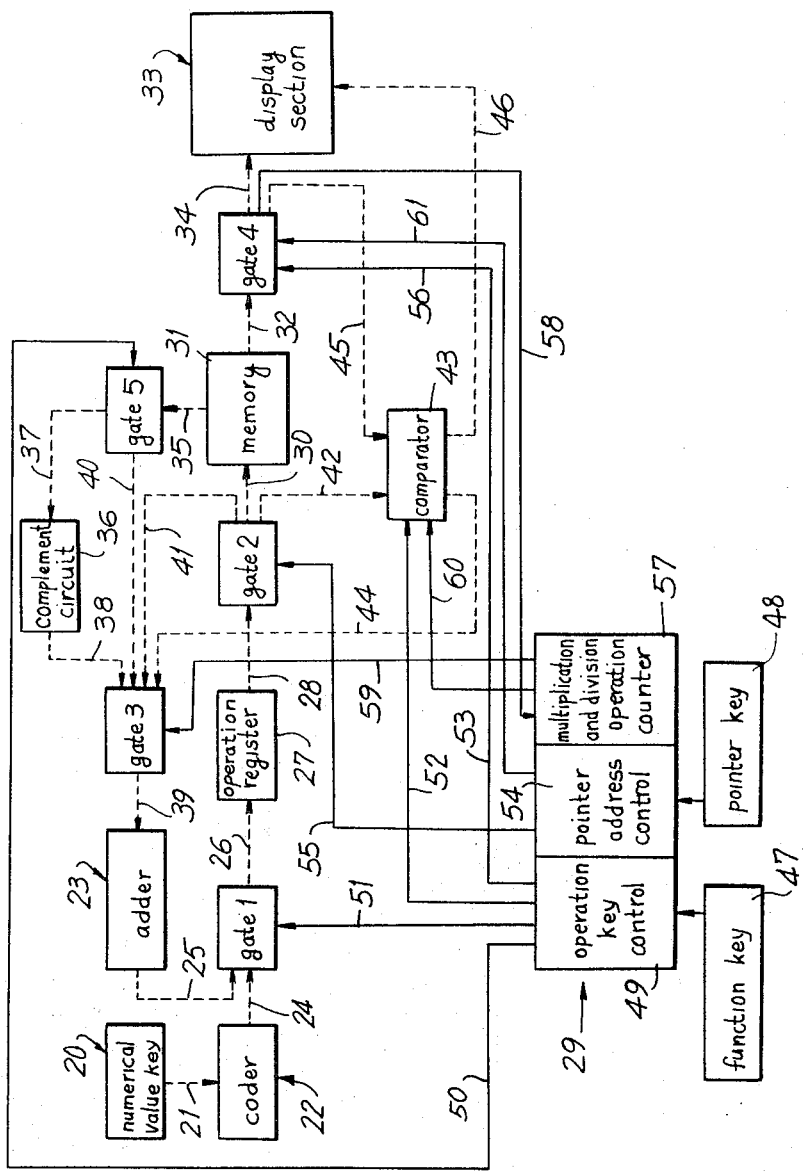

METHOD AND ELECTRONIC MACHINE FOR TEACHING ARITHMETIC COMPUTATION

BACKGROUND OF THE INVENTION

The present invention relates to educational machines and methods.

In particular, the present invention relates to a machine and method for teaching arithmetic computations.

According to conventional teaching methods, a student such as a school child will carry out arithmetic computations with pencil and paper. According to these conventinal techniques it is essential that the student check not only the result but also the calculating process itself with a teacher or with other students. This procedure requires direct personal exchange between individuals. Thus, according to these conventional techniques a student cannot learn arithmetic computation by himself.

While there are recently developed electronic computers designed to alleviate this problem, these devices indicate only the final results of the calculations so that while it is possible with such devices for a student to check the correctness of a final result, it is not possible to check as to whether or not the calculating process is correct. Thus, up to the present time there has been no way to indicate to a dtudent whether or not the method of calculation is correct except through personal exchange as pointed out above.

SUMMARY OF THE INVENTION

It is accordingly a primary object of the present invention to provide a method and machine which will avoid the above problems and drawbacks.

In particular, it is an object of th present invention to provide a method and machine which make it possible for a student to learn arithmetic computations without requiring personal exchange between individuals and with the possibility of teaching methods of calculation as well as indicating whether or not a particular final result is correct.

Thus, it is an object of the present invention to provide a method and apparatus which make it possible for students to learn arithmetic computations without requiring the presence of an instructor.

Also, it is an object of the present invention to provide a method and machine which will be capable of teaching arithmetic computation in a far shorter time than has hitherto been required.

In addition, it is an object of the present invention to provide a method and machine which will give to a student the possibility of enjoyment of the learning process.

Furthermore, it is an object of the present invention to provide a method and machine which does not burden a student with problems involved in writing with pencil and paper, with keeping the computations neat and legible, with erasures, and the like, so that it is possible for the student to concentrate to a far greater extent on the calculations themselves without being distracted by other factors such as the techniques of handling pencil and paper.

According to the invention the electronic machine includes a display means having a plurality of display locations. A manually operable numeral selecting means is provided for selection of numerals to be located at selected locations of the display means and a manually operable function selecting means is provided to enable the student to select the arithmetic functions which are to be performed. Both of the latter selecting means are operatively connected with an electronic means which in turn is operatively connected with the display means so that in response to manipulations of the two selecting means there will appear at selected locations of the display means numerals selected by the operator to show at the display means the problem and the arithmetic computations carried out in connection with the problem. In addition the electronic means operates to perform the computations automatically so that the electronic means is capable of itself determining a correct result which is stored by the electronic means. A comparing means is operatively connected on the one hand with the electronic means and on the other hand with the display means for comparing the correct result automatically calculated by the electronic means with the result which has been mentally determined by the student, and at each stage of the computation process the comparing means actuates the display means to indicate whether or not the mental calculations of the student are correct. In addition, the student has the possibility at any time of actuating the electronic means to show at the display means the correct final result. Thus, according to the method of the invention while the student mentally carries out the arithmetic computations these computations are also carried out in a fully automatic manner and at each stage of the calculating process it is possible to check the correctness of the mental calculations.

The manually operable means for selecting numerals is in the form of a suitable keyboard while the display means is in the form of a matrix having a plurality of display locations and utilizing, for example, a discharge tube, the electronic means including an operating section for carrying out the mathematical operations and processes while also controlling the operations and storing values during the computations.

BRIEF DESCRIPTION OF DRAWINGS

The invention is illustrated by way of example in the accompanying drawings which form part of this application and in which:

FIG. 1A illustrates a display matrix according to the invention;

FIG. 1B is a fragmentary illustration at an enlarged scale as compared to FIG. 1A of part of the display means of FIG. 1A to illustrate further details thereof;

FIG. 2 is a fragmentary schematic illustration of part of the keyboard arrangement which is available to be manipulated by the student; and FIG. 3 is a block diagram showing the electronic arrangement of the structure of the invention as well as illustrating the method of the invention.

DESCRIPTION OF PREFERRED EMBODIMENTS

Referring to FIG. 1A, there is illustrated therein a display means 1 used with the machine of the invention. This display means is in the form of a matrix having a plurality of display locations which are arranged in horizontally extending rows. The several rows, for the sake of convenience, are indicated in FIG. 1A by the y coordinates $y_1-y_8$. Each of the individual rows has its display locations situated one beside the other with these locations of each row indicated for the sake of convenience by the x coordinates $x_1$–$x_8$. Thus, the display means 1 takes the form of a suitable matrix having the matrix elements 2 arranged as shown in FIG. 1A. These matrix elements 2 are capable of displaying numerals 0–9, as well as mathematical symbols to indicate functions such as addition, subtraction, division, and multiplication. In addition the display means 1 can display a decimal point and also a means in the form of a suitable indicator is provided for indicating the particular selected location where a numeral will appear at the display means 1. This display means 1 may be of the cathode-ray tube type.

Referring to FIG. 1B where part of the matrix 1 is illustrated in detail, the indicating means for indicating a selected location takes the form of dots 3 in the form of small circular areas capable of becoming illuminated or being rendered luminous through the electronic means referred to below so that the glowing of one of the dots 3 will indicate to the operator the particular location of the display means where it is selected to render a selected numeral visible. Thus, these dots 3 form a pointer structure for pointing to the selected location of the display means where a selected numeral will appear.

The manually operable means of the machine of the invention includes shift keys 13–16 shown at the left part of FIG. 2. These keys are arranged on a suitable keyboard. The keys 13 and 14 form horizontal shift keys while the keys 15 and 16 form vertical shift keys. By depressing the key 13 the operator can shift the location of the luminous dot or pointer 3 by one space to the left in one of the rows $y_1$–$y_8$ while depression of the key 14 will shift the location of the luminous dot or pointer 3 one space to the right. In the same way depression of the key 15 will shift the location of the luminous dot upwardly from one row of locations to the enxt, while depression of the key 16 will shift the location of the luminous dot downwardly from one row to the next.

The keyboard includes the keys 6 which are capable of being selectively depressed for selecting numerals to be displayed at the display means 1. Thus once a given location is selected at the display means by suitable manipulation of the shift key 13–16 the operator can depress one of the value keys 6 in order to render a selected numeral visible at the selected location.

In addition to the shift keys 13–16 and the value keys 6, the keyboard includes a key 7 for selecting a decimal point which will appear at the display means 1. Also there are function keys 8–12 which can be selected to carry out the different arithmetic functions designated by the keys 8–11 and for providing an equal sign upon manipulation of the key 12.

In order to indicate whether or not the mental computations are going forward correctly the display means includes at a suitable location beyond the matrix shown in FIG. 1A a pair of indicating elements 17 and 18 in the form of suitable lamps, for example, which are illuminated to indicate correctness of a given computation. The lamp 17 may be a blue or green lamp indicating a correct computation while the indicator 18 may be a red lamp indicating an incorrect computation, and these lamps may have the designations "yes" and "no," as indicated in FIG. 2. The indicators 17 and 18 of the display means form a non-numerical means designed primarily to indicate to the student correctness of computations during the actual step-by-step computation process as each numeral appears. Whenever desired it is possible for the student to manipulate an additional key 19 of the keyboard in order to provide at the display means the correct answer which has been automatically calculated by the electronic means referred to below, so that the correct answer which has been automatically calculated can be compared with the answer which the student has arrived at mentally.

As an example, FIG. 1A shows a multiplication problem. Thus the display means 1 in the example of FIG. 1A shows a multiplier and a multiplicand situated at the selected locations in the matrix to carry out multiplication. In the example illustrated the problem is to multiply 12.5 by 2.5.

Referring to FIG. 1B, the lines 5, which have vertical and horizontal portions, can also be selectively illuminated so as to glow in accordance with responses to given signals which are introduced into the electronic apparatus. The horizontal portions of the lines 5 will be used in those arithmetic computations where a horizontal line is called for, while the vertical line portions 5 will become illuminated in those situations where division of one number by another in fractional form is to be designated. The glowing of the portions of the lines 5 is brought about automatically through the electronic structure.

In order to introduce into the matrix 1 the mathematical problem illustrated in FIG. 1A, the student will depress the shift keys 13–16 until the luminous dot 3 becomes located at the display location $x_4$, $y_1$. Now the student will depress key 1 of the value keys 6, so that the numeral 1 appears at the selected location. Then the shift key 14 is depressed and the operator will then depress the key 6 which correspond to the digit 2. In this way the number 2 appears at the display location $x_5$, $y_1$. Now the student will depress the key 7 so as to cause the decimal point to appear, and the luminous dot is again shifted by depression of the key 14 to the next display location $x_6$, $y_1$ and the operator will depress that key 6 which bears the numeral 5, so that in this way the number 12.5 appears at row $y_1$, as indicated in FIG. 1A.

The operator will now manipulate the shift keys 13–16 so as to locate the luminous dot at the display location $x_5$, $y_2$, and then the numeral 2.5 is caused to appear by repetition of the manipulations as referred to above. Thus, the operator will depress from among the keys 6, the key which bears the numeral 2, then the key 7 will be depressed to provide the decimal point, the shift key 14 is then depressed, and finally the operator depresses that one of the value keys 6 which bears the numeral 5, so that in this way the number 2.5 appears in the row $y_2$.

In order to carry out the selected arithmetic computation, the operator will depress the function key 10 causing the multiplication symbol X to appear at the left end location of the row $y_2$. At the same time a horizontal line portion 5 appears between the rows $y_2$, $y_3$ extending up to the end of the displayed numerals, as illustrated in FIG. 1A.

With the problem thus introduced into the display means 1, the student will proceed to carry out the multiplication mentally, first manipulating the keys 13–16 to locate the luminous pointer at the display location $x_6$, $y_3$ and depressing that one of the keys 6 which bears the numeral 5, as a result of the mental computations carried out by multiplying 5 by 5. Thus, the first result of the mental calculation appears with the numeral 5 at the units location in row $y_3$. Inasmuch as this is a correct result, the display lamp 17 becomes illuminated. If the student had depressed a key 6 bearing a number different from 5, then the display lamp 18 would have become automatically illuminated, thus indicating immediately to the student that an incorrect mental computation was made at this very first stage of the arithmetic process. As a result the student would remain at this point in the arithmetic calculation and attempt to arrive at the correct result. and the student will then depress other keys, while the luminous pointer or dot 3 remains at the selected location, and this can be carried out until the lamp 17 becomes illuminated indicating to the student that he has arrived at the correct result for this particular part of the arithmetic process.

In the same way the above operations proceed to locate the digit 2 at locations $x_5$, $y_3$ and the digit 6 at location $x_4$, $y_3$. Thus, the number 625 appears on the line $y_3$.

Through a repetition of the above operations the student will cause the number 250 to appear at the row of locations $y_4$, as indicated in FIG. 1A. At this time the student will depress the function key 8, to cause the addition sign to appear at the left end location of the row $y_4$, and now another line will appear automatically beneath the number 250 in the manner illustrated in FIG. 1A, so that now the addition computations will go forward. Thus the student will now add the numerals appearing at the rows $y_3$ and $y_4$, and the results which have been calculated will appear successively at the line $y_5$. Also at this stage of the process should the student select an incorrect numeral as part of the answer in row $y_5$, the lamp 18 will become illuminated, while providing correct numerals will result in illumination of the lamp 17, so that all way through the entire computation the student is given indication of whether or not the computations are going forward correctly.

Thus, it is apparent that with the method and machine of the invention it is possible for the student to obtain a correct result to a problem which he has himself introduced into the machine while carrying out operations fully equivalent to writing on paper and while at the same time receiving an indication at each stage as to whether or not the calculations are going forward correctly.

Also, as is apparent from the above description, in addition to the manually operable result-indicating means formed by the element 19 shown in FIG. 2, the lamps 17 and 18 operate continuously during the actual computations to indicate whether the calculating process is correct. Moreover, with the method and machine of the invention the student is not burdened with the technique of writing on paper. These latter manipulations are replaced by manipulation of keys of the machine, and the manipulation of keys has proved to be far more entertaining and enjoyable to a student than writing with pencil on paper, so that as a result the learning process in its entirety is rendered far more pleasant with the method and machine of the invention. In addition, the entire process goes forward much more rapidly than with pencil and paper, so that the entire learning process is shortened and students learn the arithmetic computations in a relatively short time. The machine of the invention plays the roll of the instructor while controlling the display means and while giving the training in the calculation, so that in effect there is a dialogue between the machine and the student replacing that which conventionally takes place between an instructor and a student.

The structure illustrated in FIG. 2 may be arranged at any convenient location with respect to the display means of FIG. 1A, and in fact the lamps 17 and 18 form part of the display means since these lamps indicate the correctness of any given computation step. The correct answer which appears in response to actuation of the manually operable result-indicating means 19 can be rendered visible at any desired part of the display means of FIG. 1A such as, for example, directly beneath the result which has been calculated by the student.

An electronic circuit arrangement for the machine of the invention, also illustrating the method of the invention, is schematically represented in FIG. 3. Thus, referring to FIG. 3 there is illustrated at the upper left part thereof the entire keyboard unit 20 which is capable of transmitting signals to a coder unit 22, as indicated by the dotted arrow 21. The machine also includes an electronic adder unit 23 which together with the coder 22 transmits signals to the gate 1, this interconnection being illustrated by the dotted arrows 24 extending from coder 22 to the gate 1 and 25 extending from adder 23 to the gate 1. The gate 1 in turn automatically transmits a signal, as indicated by the dotted arrow 26, to the operation register unit 27 which in turn transmits a signal, as indicated by the dotted arrow 28, to the gate 2. The circuitry includes an unillustrated synchronous pulse generator, a control section 29, and a display section 30 which includes the display means 1 as well as the lamps 17 and 18. The units 20 is formed by the several keys 6 and 7. The algorithms for carrying out the different arithmetic computations are similar to those used, for example, in a desk computer of conventional construction, except that with the machine of the present invention the memory section and the display section are especially expanded inasmuch as the most important part of the present invention resides in the calculating process. Thus, it will be seen that the gate 2 is capable of transmitting a signal, as indicated by the dotted arrow 30, to a memory unit 31 which forms the memory section in which information is temporarily stored. This memory section in turn is operatively connected with and is capable of transmitting signals to a gate 4, as illustrated by the dotted arrow 32, and the gate 4 in turn transmits signals to the display means 33, as shown by the dotted arrow 34.

The memory unit 31 in addition transmits signals, as shown by the dotted arrow 35, to a gate 5 which through a complement circuit 36 is capable of transmitting signals to a gate 3, as indicated by the dotted arrows 37 and 38, with this gate 3 in turn transmitting signals to the adder unit 23, as shown by the dotted arrow 39. It is to be noted that the gate 3 is capable of receiving signals directly from the gate 5, as shown by the dotted arrow 40, and in addition it is capable of receiving signals directly from the gate 2, as shown by the dotted arrow 41.

The gate 2 is also capable of transmitting a signal, as shown by the dotted arrow 42, to a comparing means formed by the comparator unit 43, which in turn transmits a signal to the gate 3, as shown by the dotted arrow 44. The comparing means 43 is capable of receiving a signal not only from the gate 2 but also from the gate 4, as shown by the dotted arrow 45. Moreover, the comparing means 43 can transmit a signal, as shown by the dotted arrow 46, to the display means 33.

It is to be noted that with the exception of the keyboard unit 20 of FIG. 3, all of the parts thus far described in connection ith FIG. 3 will automatically operate im accordance with the signal transmission as illustrated by the dotted arrows referred to above. The remaining arrows illustrated in FIG. 3 are indicated by solid lines, to indicate that through these solid line arrows control signals flow while the dotted line arrows represent the transmission of signals corresponding to calculating information. Thus, with the exception of the arrow 21, all of the arrows thus far described in connection with FIG. 3, which are all dotted line arrows, indicate transmission of signals which take place automatically without any initiation on the part of the operator.

The keyboard includes in addition to the unit 20 made up of the keys 6 and 7, the unit 47 made up of the function keys 8-12 and the key 19 which will provide the automatically determined answer at the display means, as pointed out above. Also the manipulations by the operator will include operation of the shift keys 13-16 which are represented by the unit 48 in FIG. 3.

The control section 29 includes the function or operation key control unit 49 which in accordance with the particular one of the function keys 8-12 and 19 which has been manipulated by the operator will transmit a signal either to the gate 5, as shown by the arrow 50, to the gate 1, as shown by the arrow 51, to the comparing means 43, as shown by the arrow 52, or to the gate 4, as shown by the arrow 53.

The control means 29 further includes the unit 54 which is a pointer address control unit for determining where the luminous dot 3 will appear in response to operation of a selected shift key 13-16 of the unit 48. Manipulation of the unit 54 by the operator will transmit a signal, as shown by the arrow 55, to the gate 2 and also a signal will under certain circumstances be transmitted to the gate 4 from the unit 54, as shown by the arrow 56. The control section 29 also includes a multiplication and division operation counter unit 57 which is not directly actuated by the operator. This unit 57 receives a signal from the gate 4, as shown by the arrow 58, and in turn it transmits a signal to the gate 3, as shown by the arrow 59. In addition a signal is transmitted from the unit 57 to the comparing means 43, as shown by the arrow 60. The unit 57 is illustrated interconnected with the gate 4 by solid arrows because the unit 57 is indirectly actuated by the operator. Thus when the multiplication key 10 or the division key 11 of the unit 48 is actuated, the signal is transmitted from the unit 54 by way of the arrow 61 to the gate 4 and automatically from the latter by way of the arrow 58 to the unit 57 which in turn transmits the signals to the gate 3 and the comparing means 43 by way of the signal transmissions 59 and 60, respectively, so that in fact the unit 57 is actuated in response to manipulation of the keys 10 or 11 but through the gate 4, so that it is for this reason that the electronic circuitry is illustrated in the above manner in the block diagram of FIG. 3.

The coder unit 22 is a known type of unit capable of converting numbers of the decimal system into a binary coded decimal system. Such structures are well known. The operation register unit 27 is a shift register which receives numerical values and which is used for temporary storage of a result derived from a given operation or the like, the register 27 also being used to carry forward the calculating process by appropriate shifting operations with respect to the place and line where the calculations are going forward. The adder unit 23 is an addition circuit having a binary coded decimal system provided with the desired number of digits and is also conventional. The memory means 31 may be in the form of a core memory, a wire memory, or that type of memory unit which utilizes a semiconductive element. This memory means 31 operates to carry out a reading out function or a writing in function and operates to store or memorize the result which is both displayed and calculated.

Although the display means includes the matrix 1 having eight places $x_1$–$x_8$ and eight lines $y_1$, $y_8$, giving a total of 64 display locations, it is to be understood that any desired number of display locations may be provided and distributed in the manner shown in FIG. 1A.

The comparing means 43 includes a circuit for comparing large or small digits or values during calculations carried out in connection with division, this comparing means 43 including also a coincidence circuit for judging the correctness or incorrectness of a result which is introduced by the student. This comparing means 43 may have a conventional construction.

The control section 29 includes the function or operation key control unit 49, the pointer address control unit 54, and the operation counter unit 57 for multiplication and division. This latter unit includes in turn an incremental or decremental counter adapted to count in accordance with the multiplier or dividend as required in the case where algorisms in connection with multiplication and division are arranged in the hardware. The unit 54 is capable of registering the four signals in the order of the four bits resulting from manipulation of the shift keys 13-16, so as to bring about lateral or vertical shifting by one space as described above, so that through signals transmitted from the unit 54 the location of the pointer or luminous dot 3 with respect to the units is counted by one shift register while the location of the luminous dot with respect to the lines is counted by another shift register during corresponding manipulations of the shift keys 13-16 by the student so that in this way the luminous dot appears at a selected display location. As a result of the input achieved through the unit 54 by manipulation of the keys which form the unit 48, the required signals are provided which correspond to the selected location at the display means and the selected location is stored in the memory means 31 as a result. The unit 49, in response to operation of the function keys which form the unit 47 serves to supply required signals to the several gates which are required for operation in response to signals which are introduced by the student, the signals being transmitted in accordance with whether the function keys for addition, subtraction, multiplication and division have been manipulated. The several gates 1-5 are in the form of gates such as flip-flop gates, AND gates, as well as OR gates. Depending upon the particular design of the machine different circuit arrangements may be used. Thus, gates 1-5 shown in the block diagram will control the calculating operations. It is to be noted, however, that the gate 4 includes a decoder which converts the particular number of the binary coded decimal system back into a number of decimal system. Also, it is to be noted that although as described above the pointer or luminous dot is used for designating the selected location where the operator chooses to have a numeral displayed at each step of the calculating process, the arrangement may also be such that by providing one digit at the unit place on a given line, the subsequent places for a particular number will be automatically determined. The particular manner in which the pointer system with the luminous dot is used is selected in such a way that the highest efficiency is achieved for educational or training purposes. The depression of the key 19 which forms the result-indicating means which is manipulated by the operator will bring about a display of the correct result, in the manner described above. Thus, the result which has been automatically calculated and stored at the memory means 31 is transmitted through the gate 4 by way of the transmissions 32 and 45 to the comparing means 43, and when the key 19 is depressed a signal is transmitted to the comparing means 43 through the signal transmission 52, so as to then provide through the transmission 46 an indication of the correct result which can be compared with the result calculated by the student. It is through the transmissions 45 and 46 that the lamps 17 and 18 are automatically operated at each step of the calculating process. On the other hand, the numeral selected by the operator are directly displayed at the display means 33 through the transmission 34 from the gate 4.

Thus, as is apparent from the above description, the electronic machine and method of the invention is capable of educating a student in arithmetic calculations in addition, subtraction, multiplication, and division, with the method and machine of the invention being useful not only in school but also in the home because the indications are all made at the display means with the calculating process forming an input from the student while each stage of the calculating process is checked automatically by the machine itself with an indication of correctness or incorrectness being displayed so as to enable the student to practice the above arithmetic calculations in the same way as is conventional with pencil and paper even though there is no instructor, the instruction being carried out by way of the machine and method of the invention.

What is claimed is:

1. In an electronic machine for teaching arithmetic computation, display means having a plurality of display locations, manually operable numeral selecting means for selecting problem and computation numerals to be displayed at said locations, manually operable function selecting means for selecting arithmetic functions to be carried out with the selected problem numerals, electronic operatively connected with both of said selecting means and with said display means for controlling the latter to display manually selected problem and computation numerals and for automatically performing correct arithmetic computations with signals received from said function selecting means, said electronic means actuating said display means to display only the manually selected problem and computation numerals, and comparing means operatively connected with said electronic means and with said display means for comparing the automatically determined but not displayed correct computations step-by-step with the manually selected computation numerals as each of the latter numerals is selected during a sequential computation enumeration from which a result is elicited and said display means including a non-numerical indicating means operatively connected with said comparing means to be actuated thereby for indicating whether the manually selected and displayed computation numerals are correct as each of the latter numerals appears at said display means in response to operation of said manually operable numeral selecting means by the operator so that the operator without receiving an indication of the correct numeral can replace at a given display location an incorrect numeral with another numeral until the correct numeral is displayed.

2. The combination of claim 1 and wherein said comparing means is operatively connected with said electronic means and with said display means for actuating said display means to independently indicate at said display means a correct final result to be compared with the final result displayed in response to operation of the manually operable numeral selecting means.

3. The combination of claim 2 and wherein a manually operable result-indicating means is operatively connected with said electronic means for acting through the latter on said comparing means to provide through the latter at said display means an indication of a correct result.

4. The combination of claim 1 and wherein a manually operable location selecting means is operatively connected with said electronic means for acting through the latter on said display means to select the locations of the latter where numerals will be displayed.

5. The combination of claim 4 and wherein said display means includes horizontal rows of display locations, said rows being vertically distributed one beneath the next at said display means, and said manually operable location selecting means including vertical shift keys for shifting a selected location vertically from one row to the next, and horizontal shift keys for shifting a selected location horizontally in a given row from one location therein to the next location therein.

6. The combination of claim 5 and wherein an indicating means is operatively connected with said display means for indicating the selected location.

* * * * *